Nov. 24, 1964   J. H. ADAMS ETAL   3,158,281
SEAL FOR VACUUM VESSEL HAVING REMOVABLE HEAD
Filed June 5, 1962
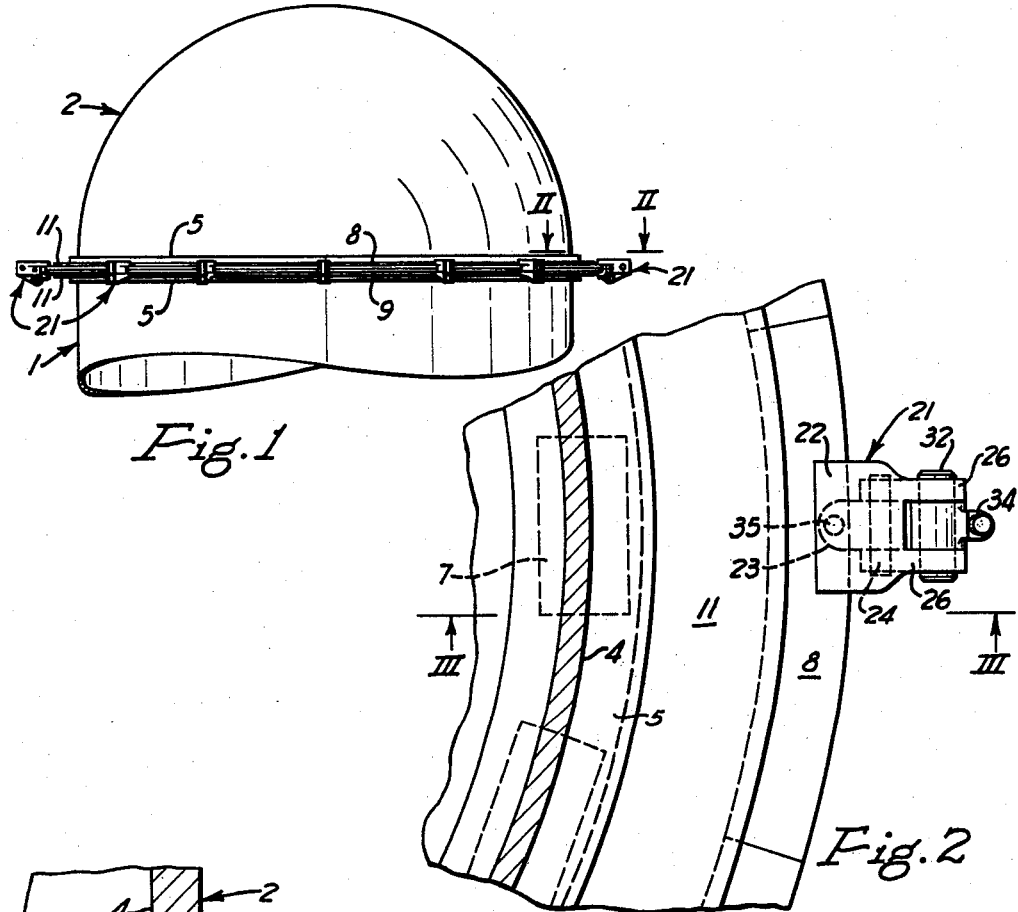
Fig.1
Fig.2
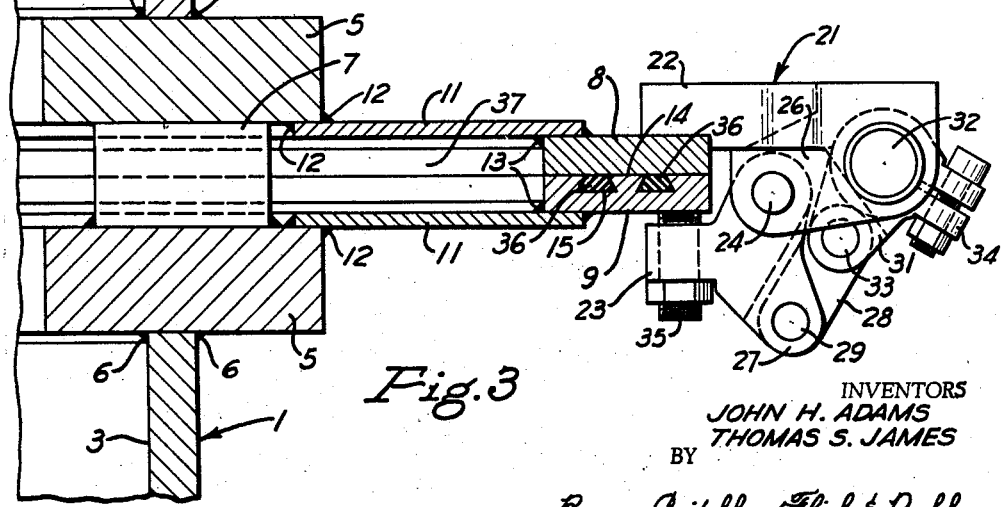
Fig.3
INVENTORS
JOHN H. ADAMS
THOMAS S. JAMES
BY
Brown, Critchlow, Flick & Peckham.
ATTORNEYS.

3,158,281
SEAL FOR VACUUM VESSEL HAVING
REMOVABLE HEAD
John H. Adams and Thomas S. James, Pittsburgh, Pa.,
assignors to Pittsburgh-Des Moines Steel Company,
Pittsburgh, Pa., a corporation of Pennsylvania
Filed June 5, 1962, Ser. No. 200,273
8 Claims. (Cl. 220—46)

The invention relates to, and has for its principal object the provision of, a seal between the shell and removable head of a vacuum vessel, and more particularly to such a seal that will eliminate the need for machining large diameter, heavy flanges to provide the sealing surfaces.

Other objects will be apparent from the following description of the invention in connection with the attached drawings, in which:

FIG. 1 is a fragmentary elevation of a vacuum vessel with a removable head;

FIG. 2 is an enlarged plan view along the line II—II of FIG. 1; and

FIG. 3 is a sectional elevation, still further enlarged, along the line III—III of FIG. 2.

In accordance with this invention, the joint between the shell of a vacuum vessel and its removable head is sealed by a pair of relatively light annular sealing flanges, sealingly supported, and at least one of them flexibly supported as well, from the shell and head and in radially outward spaced relation thereto. Means are provided for clamping the sealing flanges together, so that their opposing faces and appropriate gasket material are forced into sealing engagement.

Referring to the drawings, a conventional vacuum vessel includes a cylindrical shell 1 and a detachable hemispherical head 2. The adjacent edges 3 and 4 of the shell and head, respectively, are each reinforced by a circular flange 5 secured to the edge by continuous welds 6. These flanges are not machined, since their function is not to seal but to act as load bearing and radial reinforcing members. Spacer blocks 7 are inserted between the two flanges 5 to separate them and to allow the vacuum in the sealed vessel to enter the space between the seal supports to be described below. Blocks 7 are spaced circumferentially from each other and welded to one or the other of the reinforcing flange 5.

The vacuum seal between the head and shell is effected by a pair of annular sealing flanges 8 and 9, sealingly supported from reinforcing flanges 5. Various supporting means may be used, and at least one of them should be flexible in response to vertical forces. The preferred flexible supporting means illustrated in the drawings are annular steel discs or plates 11. One of the plates is mounted by continuous welds 12 to the bottom of reinforcing flange 5 on the head. The other is similarly mounted on top of the reinforcing flange on the shell. These two plates extend radially outward beyond the shell and head a sufficient distance to provide the desired flexibility in a vertical direction. To their outer edges are secured sealing flanges 8 and 9 by continuous welds 13. These sealing flanges are relatively light flat steel rings having opposing sealing surfaces 14. Those surfaces are preferably machined to a flat finish; and, in addition, one of them has grooves 15 machined therein. Because the sealing flanges are of relatively light construction, they can be formed from one or more straight strips which, after being machined, can be rolled into one or more circular segments (without affecting the integrity of the grooves 15 machined therein) and butt welded (with continuous welds) to form the finished sealing flanges. Alternatively, flanges 8 and 9 can be made of circular or straight segments, machined, and butt welded without bending, or, in the same way, of straight segments that when welded form a polygonal flange. It will be understood, of course, that any welds extending across the sealing surfaces 14 and grooves 15 should be ground down flush with the adjacent surface.

Sealing flanges 8 and 9 are clamped together and held in their clamped positions by suitable clamping devices, for example, by toggle clamps, generally indicated in the drawings by the reference numeral 21. Each clamp includes a base portion 22, permanently fastened to one of the sealing flanges and projecting beyond its outer edge, and a movable toe piece 23. The latter is rotatably mounted on a pin 24, extending through side pieces 26 of the clamp, and has a forked arm 27 to which is pivoted a toggle link 28 on a pin 29. A second toggle link 31 is mounted on a pivot pin 32 extending between the side pieces. The two links are connected by a pin 33. The second link 31 can be manually turned by means of an actuator bar (not shown) connected to an arm 34 clamped on pin 32. The clamp is self-locking in the position shown in FIG. 3, where toggle links 28 and 31 have been turned past the center line joining the axes of their pivots. An adjusting screw 35 on the toe of the clamp permits adjustment of the clamping pressure. Suitable gasket material, such as a rubber strip 36, is placed in each of the grooves 15 on the lower sealing flange 9, and this material is compressed to form a leakproof seal when flanges 8 and 9 are clamped together.

It is among the advantages of this invention that the seal can be used with extremely large vacuum chambers, such as those intended for space simulation experiments, without the expensive machining operations that would be required with conventional sealing designs. Normally, such vacuum vessels would have large diameter machined flanges integral with the shell and head, requiring for their manufacture either extremely large machining equipment in the shop with subsequent welding, and its attendant distortions, when assembling the vessel in the field, or apparatus in the field to machine the flanges during the assembly of the vessel. In either case, the conventional procedure is very expensive and time consuming and on occasion cannot, as a practical matter, be done at all. With the present invention, as already indicated, the sealing means are relatively simple and inexpensive to manufacture and assemble; and, because of its inherent flexibility, the seal readily accommodates itself to deformations or irregularities in shell or head. In addition, the adjoining edges of shell and head are radially reinforced not only by reinforcing flanges 5, but also by the supporting discs or plates 11 and by sealing flanges 8 and 9, which prevent the edges of the shell and head from collapsing due to external pressure when the vessel is evacuated. Furthermore, on evacuation of the vessel, the vacuum extends from inside the vessel to the annular space 37 between supporting plates 11, so that external atmospheric pressure applies considerable forces to the outside of those plates, which, in cooperation with the forces applied by the clamps, hold the sealing flanges in tight sealing engagement.

While the invention has been described herein as including two flexible plates 11 and two flexible sealing flanges 8 and 9 connected thereto, it will be apparent that the same general results can be obtained if only one of the plates 11 and its connected flange 8 or 9 are flexible in response to forces normal to the plane of those members, and that the other plate and its attached flange can be made of heavier and more rigid materials. In such case, the conformity between the sealing surfaces of the two flanges that is necessary for leakproof sealing is obtained by clamping the flexibly mounted sealing surface against the more rigidly mounted mating surface. In any case, the clamping devices 21, or equivalent devices, are located as close together as may be required to provide the desired conformity between the sealing surfaces.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. In a large diameter vacuum vessel having a shell and a removable head, means for sealing the joint between head and shell, comprising: separate reinforcing flanges welded to the edges of shell and head adjacent the joint, interrupted spacing means located between the reinforcing flanges for separating those flanges in their assembled position, a pair of annular sealing flanges, means sealingly supporting one of the sealing flanges from the shell in outwardly spaced relation to the joint, separate means sealingly supporting the other sealing flange from the head in outwardly spaced relation to the joint, the two sealing flanges having opposing mating surfaces, the supporting means for at least one of the sealing flanges being flexible in response to stresses normal to the plane of the mating surface of that flange, and releasable clamping means for clamping the mating surfaces of the sealing flanges into sealing conformity.

2. In a large fabricated metal vacuum vessel having a shell and a large removable closure member, means for providing a sealed joint between the edges of shell and closure member when the interior of the vessel is subjected to a very high vacuum, said means comprising: separate reinforcing means sealingly secured to the edges of the shell and closure member to provide a non-sealing load bearing joint between shell and closure member in the assembled vacuum vessel, a pair of sealing flanges, means sealingly supporting one of the flanges on the shell in spaced relation to the reinforcing means on the shell, separate means sealingly supporting the other flange on the closure member in spaced relation to the reinforcing means on that member, the two sealing flanges having opposed mating surfaces and being supported with those surfaces in sealing engagement, the supporting means for at least one of the sealing flanges being substantially thinner in cross-section than its supported sealing flange and being flexible in response to stresses normal to the plane of said mating surfaces, and releasable clamping means for clamping the mating surfaces into sealing conformity, whereby the sealing flanges will perform only a sealing function and no appreciable load bearing function and the reinforcing means will perform only a load bearing function and no sealing function.

3. Apparatus according to claim 2, in which the supporting means for at least one of the sealing flanges includes an annular disc of sufficient radial extent to provide the desired flexibility.

4. Apparatus according to claim 2, in which the clamping means are external clamping means that do not extend through the sealing flanges or into the sealed space between the supporting means for those flanges.

5. Apparatus according to claim 2, in which at least one of the sealing flanges is also flexible along its length in response to and in the direction of forces normal to the plane of said mating surfaces.

6. Apparatus according to claim 2, in which the clamping means are of the quick-release type for rapid clamping and unclamping of the sealing flanges.

7. Apparatus according to claim 2, in which the mating face of at least one of the sealing flanges is provided with at least one continuous groove and resilient sealing material is received in such groove for sealing engagement with the mating face of the opposing flange when the two flanges are clamped together.

8. In a large vacuum vessel having a head removable from the shell of the vessel, means for sealing the joint between the opposed edges of the head and shell, comprising: reinforcing members sealingly secured to the opposed edges of the shell and head, interrupted spacing means separating those members to provide a non-sealing load bearing joint between head and shell in the assembled vacuum vessel, a pair of sealing flanges, means sealingly supporting one of the flanges from the shell in outwardly spaced relation to the reinforcing members on the shell, separate means sealingly supporting the other flange from the head in outwardly spaced relation to the reinforcing member on the head, the two sealing flanges having opposed mating and sealing surfaces, the supporting means for at least one of the flanges being substantially thinner in cross-section than its supported sealing flange and being flexible in response to and in the direction of forces normal to the plane of those mating surfaces, and releasable clamping means for clamping the mating surfaces into sealing conformity, whereby the sealing flanges will perform only a sealing function and no appreciable load bearing function and the reinforcing members will perform only a load bearing function and no sealing function.

References Cited in the file of this patent

UNITED STATES PATENTS

| 954,668 | Cable et al. | Apr. 12, 1910 |
| 2,590,803 | Unger | Mar. 25, 1952 |

FOREIGN PATENTS

| 12,334 | Netherlands | Dec. 15, 1924 |